United States Patent
Dolgopolov (10) Patent No.: US 12,514,940 B2
(45) Date of Patent: Jan. 6, 2026

(54) DEVICE AND METHOD FOR DEACTIVATING PATHOGENS IN BLOOD PLASMA, BLOOD PRODUCT AND BIOLOGICAL PRODUCT

(71) Applicant: Millisecond Technologies Corp., New York, NY (US)

(72) Inventor: Dmitry Dolgopolov, Moscow (RU)

(73) Assignee: Millisecond Technologies Corp., New York, NY (US)

( * ) Notice: Subject to any disclaimer, the term of this patent is extended or adjusted under 35 U.S.C. 154(b) by 938 days.

(21) Appl. No.: 17/263,861

(22) PCT Filed: Aug. 24, 2018

(86) PCT No.: PCT/US2018/048008
§ 371 (c)(1),
(2) Date: Jan. 27, 2021

(87) PCT Pub. No.: WO2020/023067
PCT Pub. Date: Jan. 30, 2020

(65) Prior Publication Data
US 2021/0308292 A1  Oct. 7, 2021

(30) Foreign Application Priority Data
Jul. 27, 2018  (RU) .......................... RU2018127700

(51) Int. Cl.
*A61L 2/04* (2006.01)
*A23B 2/10* (2025.01)
(Continued)

(52) U.S. Cl.
CPC ............ *A61L 2/04* (2013.01); *A23B 2/103* (2025.01); *A23B 2/708* (2025.01); *A23B 11/12* (2025.01); *A23C 2210/15* (2013.01)

(58) Field of Classification Search
CPC ..... A61L 2/02; A61L 2/04; A23C 3/00; A23C 3/02; A23C 2210/15; A23L 3/0155; A23L 3/3418
See application file for complete search history.

(56) References Cited

U.S. PATENT DOCUMENTS 1,711,097 A    4/1929  Kratzer
1,819,023 A *  8/1931  Grindrod ................. A23B 2/48
                                              99/453

(Continued)

FOREIGN PATENT DOCUMENTS

CA    2594134      3/2015
CN    2031204 U    1/1989
(Continued)

OTHER PUBLICATIONS

Belford, "University of Arkansas at Little Rock: Chem 1403 General Chemistry II" textbook, Chapter 13.4, "Pressure and Temperature Effects on Solubility" (Year: 2023).*

(Continued)

*Primary Examiner* — Jennifer Wecker
*Assistant Examiner* — Brady C Pilsbury
(74) *Attorney, Agent, or Firm* — Snell & Wilmer L.L.P.

(57) ABSTRACT

Disclosed are methods and devices for reducing the number of pathogens in a liquid. The methods or devices uses one or more of pressure, pressure drop, increased temperature, rate of temperature increase, and inert gas to kill pathogens. In one embodiment, inert gas is dissolved into a liquid at a pressure greater than ambient pressure. The pressure is later rapidly reduced, which causes inert gas to be released from the liquid. This reduces the number of pathogens in the liquid. Other method steps or processes that do not utilize inert gas are also disclosed.

23 Claims, 2 Drawing Sheets

(51) Int. Cl.
  *A23B 2/708* (2025.01)
  *A23B 11/12* (2025.01)

(56) References Cited

U.S. PATENT DOCUMENTS

| | | | |
|---|---|---|---|
| 2,052,967 A | 9/1936 | Fredrik | |
| 2,374,805 A | 5/1945 | Camelford | |
| 2,944,479 A | 7/1960 | Walsh et al. | |
| 4,776,268 A | 10/1988 | Bronnert | |
| 4,787,304 A | 11/1988 | Bronnert | |
| 5,092,230 A | 3/1992 | Bronnert | |
| 5,232,726 A | 8/1993 | Clark et al. | |
| 5,583,960 A * | 12/1996 | Reznik | A61L 2/03 392/338 |
| 5,652,006 A * | 7/1997 | Assinder | A23B 7/01 392/323 |
| 5,914,255 A | 6/1999 | Grae | |
| 6,251,341 B1 | 6/2001 | Zimmer | |
| 6,471,914 B2 | 10/2002 | Platz et al. | |
| 6,736,966 B2 | 5/2004 | Herrington et al. | |
| 6,749,809 B2 | 6/2004 | Karasawa | |
| 7,708,941 B2 | 5/2010 | Arofikin | |
| 8,449,820 B2 | 5/2013 | Volkov et al. | |
| 9,821,994 B2 | 11/2017 | McIntyre et al. | |
| 10,194,680 B2 | 2/2019 | Arofikin | |
| 2001/0038806 A1 | 11/2001 | Herrington et al. | |
| 2002/0020675 A1 | 2/2002 | Aksenov et al. | |
| 2002/0168734 A1 * | 11/2002 | Grae | C12N 13/00 435/173.1 |
| 2003/0035752 A1 | 2/2003 | Lutzer | |
| 2004/0161363 A1 | 8/2004 | Volkov | |
| 2004/0170731 A1 | 9/2004 | Subramaniam | |
| 2006/0199258 A1 | 9/2006 | Aksenov et al. | |
| 2007/0184157 A1 * | 8/2007 | Stegmaier | A23L 2/02 426/399 |
| 2008/0038150 A1 * | 2/2008 | Volkov | A23L 2/42 422/26 |
| 2010/0322821 A1 | 12/2010 | Volkov | |
| 2011/0171353 A1 | 7/2011 | Garwood | |
| 2013/0122159 A1 * | 5/2013 | Duarte Vieira | A23C 3/00 99/485 |
| 2013/0302211 A1 | 11/2013 | Volkov et al. | |
| 2014/0261017 A1 | 9/2014 | Arofikin | |
| 2016/0000100 A1 * | 1/2016 | Döring | A23B 11/137 426/511 |
| 2016/0278413 A1 | 9/2016 | Van Den Brenk et al. | |
| 2018/0092385 A1 | 4/2018 | Arofikin | |
| 2019/0124954 A1 | 5/2019 | Arofikin | |
| 2020/0345042 A1 * | 11/2020 | Trifunovic | A23L 3/34095 |
| 2021/0153528 A1 * | 5/2021 | Young | E04H 7/30 |

FOREIGN PATENT DOCUMENTS

| | | | |
|---|---|---|---|
| CN | 1166124 A | 11/1997 | |
| CN | 201888207 U | 7/2011 | |
| CN | 107787188 | 3/2018 | |
| EP | 979657 A1 * | 2/2000 | A23L 3/3454 |
| FR | 2735039 | 12/1996 | |
| GB | 413460 | 7/1934 | |
| IL | 184161 | 3/2012 | |
| JP | S56-64771 | 3/1986 | |
| JP | 01097459 | 4/1989 | |
| JP | 2001346515 | 12/2001 | |
| NZ | 707324 | 10/2018 | |
| SU | 1745190 | 7/1992 | |
| WO | 199732483 | 9/1997 | |
| WO | 200056161 | 9/2000 | |
| WO | 2001013772 | 3/2001 | |
| WO | 2005042219 | 5/2005 | |
| WO | 2007008618 | 1/2007 | |
| WO | 2011143731 | 11/2011 | |
| WO | 2014160020 | 10/2014 | |
| WO | 2016172627 | 10/2016 | |

OTHER PUBLICATIONS

J.T. Barach et al., "Mechanism of Low Temperature Inactivation of a Heat-Resistant Bacterial Protease in Milk", Journal of Dairy Science 61, pp. 523-528, 1978 (Year: 1978).*
Machine Translation of WO 2011/143731 A1, cited in IDS filed Nov. 11, 2021 (Year: 2011).*
WIPO; Written Opinion dated Apr. 26, 2006 in Int'l. Appl. No. PCT/IB2005/003879.
WIPO; International Search Report dated Apr. 28, 2006 in Int'l. Appl. No. PCT/IB2005/003879.
WIPO; International Preliminary Report on Patentability dated Jun. 26, 2007 in Int'l. Appl. No. PCT/IB2005/003879.
USPTO; Office Action dated Jun. 27, 2008 in U.S. Appl. No. 11/821,216.
USPTO; Office Action dated Feb. 19, 2009 in U.S. Appl. No. 11/821,216.
USPTO; Notice of Allowance dated Oct. 16, 2009 in U.S. Appl. No. 11/821,216.
SIPO; Office Action dated Mar. 3, 2010 in CN Application No. 200580048538.9.
USPTO; Notice of Allowance dated Jan. 28, 2010 in U.S. Appl. No. 11/821,216.
USPTO; Office Action dated Sep. 30, 2010 in U.S. Appl. No. 12/772,610.
ILPO; Office Action dated Jan. 25, 2011 in IL Application No. 184,161.
USPTO; Office Action dated Jun. 30, 2011 in U.S. Appl. No. 12/772,610.
SIPO; Office Action dated Jul. 6, 2011 in CN Application No. 200580048538.9.
SIPO; Office Action dated Dec. 13, 2011 in CN Application No. 200580048538.9.
USPTO; Office Action dated Dec. 29, 2011 in U.S. Appl. No. 12/772,610.
CIPO; Office Action dated May 3, 2012 in CN Application No. 2,594,134.
SIPO; Office Action dated Aug. 31, 2012 in CN Application No. 200580048538.9.
USPTO; Office Action dated Sep. 12, 2012 in U.S. Appl. No. 12/772,610.
SIPO; Office Action dated Jan. 5, 2013 in CN Application No. 200580048538.9.
USPTO; Notice of Allowance dated Jan. 24, 2013 in U.S. Appl. No. 12/772,610.
CIPO; Office Action dated Jan. 30, 2013 in CN Application No. 2,594,134.
SIPO; Notice on Grant of Patent Right for Invention dated Jul. 4, 2013 in CN Application No. 200580048538.9.
USPTO; Restriction Requirement dated Oct. 15, 2013 in U.S. Appl. No. 13/826,856.
USPTO; Office Action dated Jan. 14, 2014 in U.S. Appl. No. 13/826,856.
USPTO; Final Office Action dated Jun. 23, 2014 in U.S. Appl. No. 13/826,856.
USPTO; Office Action dated Nov. 4, 2014 in U.S. Appl. No. 13/826,856.
USPTO; Restriction Requirement dated Feb. 20, 2015 in U.S. Appl. No. 13/800,100.
WIPO; Written Opinion and International Search Report dated Mar. 20, 2015 in Int'l. Appl. No. PCT/US2014/025637.
USPTO; Final Office Action dated Apr. 9, 2015 in U.S. Appl. No. 13/826,856.
USPTO; Office Action dated May 27, 2015 in U.S. Appl. No. 13/800,100.
USPTO; Final Office Action dated Sep. 21, 2015 in U.S. Appl. No. 13/800,100.
USPTO; Advisory Action dated Nov. 30, 2015 in U.S. Appl. No. 13/800,100.
WIPO; International Preliminary Report on Patentability dated Apr. 22, 2016 in Int'l. Appl. No. PCT/US2016/029045.

(56) References Cited

OTHER PUBLICATIONS

WIPO; International Search Report dated Apr. 22, 2016 in Int'l. Appl. No. PCT/US2016/029045.
WIPO; Written Opinion dated Apr. 22, 2016 in Int'l. Appl. No. PCT/US2016/029045.
USPTO; Office Action dated Apr. 27, 2016 in U.S. Appl. No. 13/800,100.
USPTO; Final Office Action dated Sep. 15, 2016 in U.S. Appl. No. 13/800,100.
IPAU; Office Action dated Jun. 15, 2017 in AU Application No. 2014244186.
IPONZ; Office Action dated Jun. 2, 2017 in NZ Application No. 707324.
IPONZ; Office Action dated Aug. 16, 2017 in NZ Application No. 707324.
SIPO; Office Action dated Oct. 18, 2017 in CN Application No. 201480026887.
SIPO; Office Action dated Apr. 11, 2018 in CN Application No. 201480026887.
EPO; Office Action dated Apr. 23, 2018 in EP Application No. 14724546.8.
JPO; Office Action dated Jun. 13, 2018 in JP Application No. 201601927.
IPAU; Notice of Allowance dated Jun. 13, 2018 in AU Application No. 2014244186.
USPTO; Notice of Allowance dated Oct. 3, 2018 in U.S. Appl. No. 13/800,100.
SIPO; Office Action dated Jan. 14, 2019 in CN Application No. 201480026887.
ILPO; Office Action dated Mar. 6, 2019 in IL Application No. 241189.
JPO; Final Office Action dated Mar. 6, 2019 in JP Application No. 2016-501927.
IMPI; Office Action dated Apr. 9, 2019 in MX Application No. MX/a/2015/012513.
IPONZ; Office Action dated May 10, 2019 in NZ Application No. 743173.
IMPI; Notice of Allowance dated May 27, 2019 in MX Application No. MX/a/2015/012513.
SIPO; Notice on Grant of Patent Right for Invention dated Jul. 8, 2019 in CN App. No. 201480026887.
WIPO; Written Opinion and International Search Report dated Jul. 11, 2019 in Int'l. Appl. No. PCT/US2018/048008.
IPAU; Examination Report dated Jul. 24, 2019 in AU Application No. 2018204275.
INPI; Preliminary Office Action dated Jul. 30, 2019 in BR Application No. 1120150227490.
IPAU; Examination Report dated Aug. 20, 2019 in AU Application No. 2016250989.
USPTO; Office Action dated Oct. 25, 2019 in U.S. Appl. No. 15/567,594.
EPO; Examination Report dated Nov. 7, 2019 in EP Application No. 14724546.8.
CIPO; Office Action dated Nov. 8, 2019 in CA Application No. 2,903,503.
JPO; Office Action dated Dec. 3, 2019 in JP Application No. 2016-501927.
IPONZ; Examination Report dated Dec. 23, 2019 in NZ Application No. 743173.
EPO; Examination Report dated Jan. 2, 2020 in EP Application No. 16725955.5.
IPIN; Examination Report dated Jan. 6, 2020 in IN Application No. 9132/DELNP/2015.
USPTO; Final Office Action dated Apr. 21, 2020 in U.S. Appl. No. 15/567,594.
Engineering Archives: Absolute, Gage, Vacuum and Atmospheric Pressures; pp. 1 and 2.
Vasquez-Caicedo et al., "High Pressure Stabilization of Wines: Impact of Pressure Change Technology on Wine Quality," Fraunhofer IGB (fraunhofer.eu), 1 page.

\* cited by examiner

DEVICE AND METHOD FOR DEACTIVATING PATHOGENS IN BLOOD PLASMA, BLOOD PRODUCT AND BIOLOGICAL PRODUCT

CROSS REFERENCE TO RELATED APPLICATIONS

This application is a U.S. national stage entry under 35 U.S.C. § 371 of International Application No. PCT/US2018/048008 filed Aug. 24, 2018 entitled "DEVICE AND METHOD FOR DEACTIVATING PATHOGENS IN BLOOD PLASMA, BLOOD PRODUCT AND BIOLOGICAL PRODUCT." which claims priority to, and the benefit of, Russia Application Serial No. 2018127700, filed on Aug. 27, 2018. Each of the foregoing applications are hereby incorporated by reference in their entirety.

FIELD AND BACKGROUND OF THE INVENTION

This disclosure includes methods and devices that utilize one or more of pressure, pressure drop, rate of pressure drop, temperature, rate of temperature increase, and inert gas, to kill and/or deactivate pathogens in a liquid. The liquid may be, for example, water, a blood product, blood plasma, a biological product, milk, fruit juice (such as orange juice), coconut milk, a liquid food product, a pharmaceutical, a biological product, precursors for making a pharmaceutical, albumin, immunoglobulin, bovine colostrum, serums, culture media, dairy products other than milk, vegetable juice, coconut water, brewer's wort, wine base, or any liquid in which the quantity of pathogens is to be reduced. All such liquids, plus any other liquid in which the number of pathogens are to be reduced, are collectively referred to herein as "liquid." "Reduce" or "reducing" the number of pathogens means to kill and/or deactivate them. When deactivated, pathogens lose the ability to live and multiply normally, although they may still be alive.

The following are incorporated herein by reference: RU 2277834, A23L 3/16, 20.06.2006, PCT/US16/29045, 22.04.2016, U.S. Pat. Nos. 7,708,941, 8,449,820, U.S. Patent Publication No. 2014/0261017, and U.S. Patent Publication No. 2018/0092385. The prior art does not include methods and devices as set forth herein, nor is it believed to enable killing or deactivating small pathogens, such as viruses.

SUMMARY

Methods and devices according to this disclosure reduce the amount, fully or partially, of pathogens, such as viruses, bacteria, fungi, and other microbes in a liquid. The methods and devices may be used to treat liquids in any area of industry.

Further, methods and devices according to this disclosure are more likely to preserve much of the desirable baseline properties of the liquid, for example: the composition and biological activity of blood plasma proteins, or the liquid's color, taste, or nutritional value. This is due to the nature of one or more method steps, and the relatively short time in which some method steps are performed. In some embodiments, one or more method steps take place over a short period of time, such as in fractions of a second. Further, steam need not be used in some embodiments.

As used herein, "inert" refers to a gas that does not significantly react with the liquid with which the gas is used, such that it would have a commercially negative effect on the liquid's properties. Some gases may be considered to be inert with respect to one liquid, but not with respect to another. One inert gas that may be used in embodiments of this disclosure is nitrogen. If utilized, the inert gas is dissolved into the liquid. For example, the inert gas can be transferred from an external starting container (such as a cylinder of compressed nitrogen), and delivered to a first vessel that contains the liquid. In the first vessel, at a pressure greater than ambient pressure, and in some preferred embodiments, about bar (in this description, one bar is equal to 0.1 MPa) or more, or 12.5 bar or more, greater than ambient pressure, some of the gas is dissolved in the liquid. Ambient pressure is preferably about 1 bar, but can be any suitable pressure. The greater pressure increases the amount of inert gas in the liquid, as compared to the amount of inert gas that would be in the liquid at ambient pressure inside of first vessel 70 after inert gas is introduced.

The pressure of the liquid and inert gas mixture is then reduced, such as by the liquid being released through a nozzle, so inert gas is rapidly released from the liquid. This physically damages and reduces the number of pathogens in the liquid. In exemplary embodiments, the pressure drops from about 11 bar or more, or about 13.5 bar or more, at a rate that preferably does not exceed 10,000 bar/sec.

The liquid may also be heated before and/or after being pressurized in the first vessel, and/or when the liquid is in the second vessel.

Other methods and devices are also disclosed, some of which do not use inert gas.

BRIEF DESCRIPTION OF THE DRAWING FIGURES

Exemplary embodiments of the present invention will be described in connection with the appended drawing figures, in which.

DETAILED DESCRIPTION

The description of exemplary embodiments of the present invention provided below is merely intended for purposes of illustration only, and is not intended to limit the scope of the invention as claimed.

Figure 1:
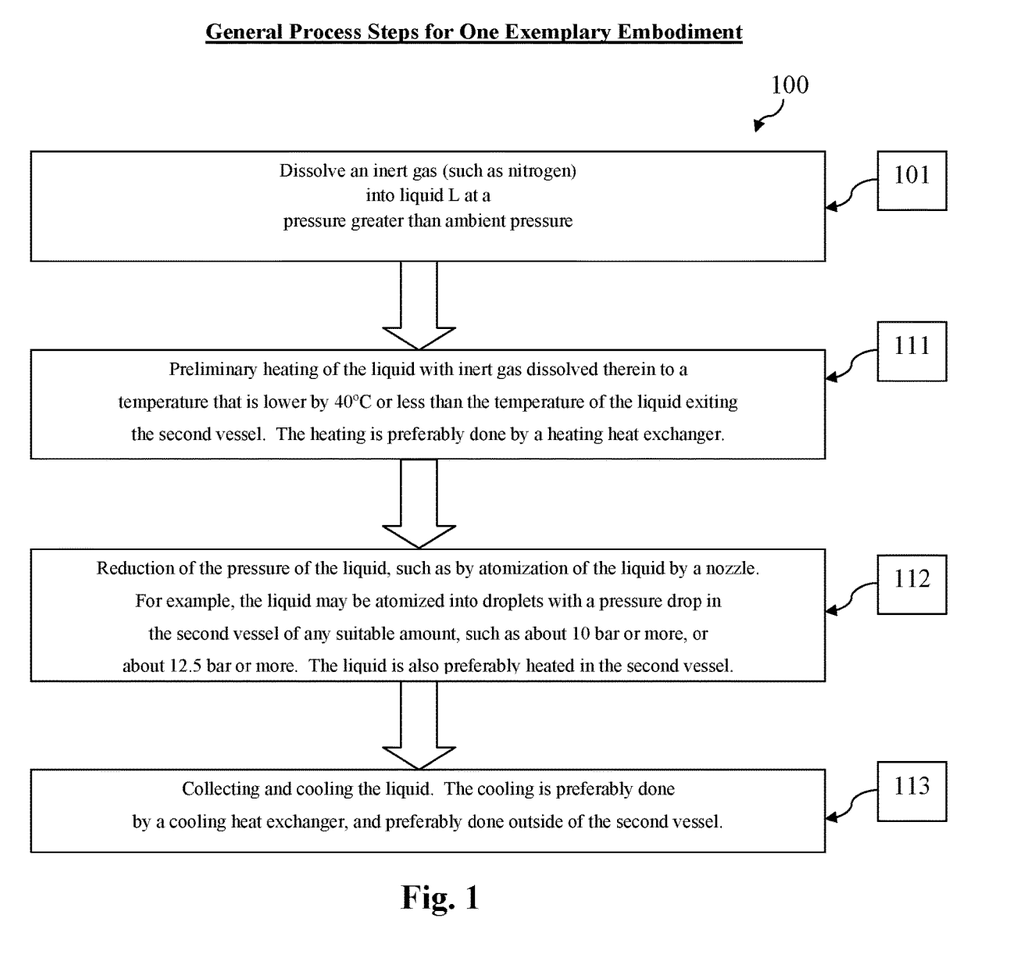
FIG. 1 illustrates a method of treating a liquid in accordance with an exemplary embodiment of the invention.
Figure 2:
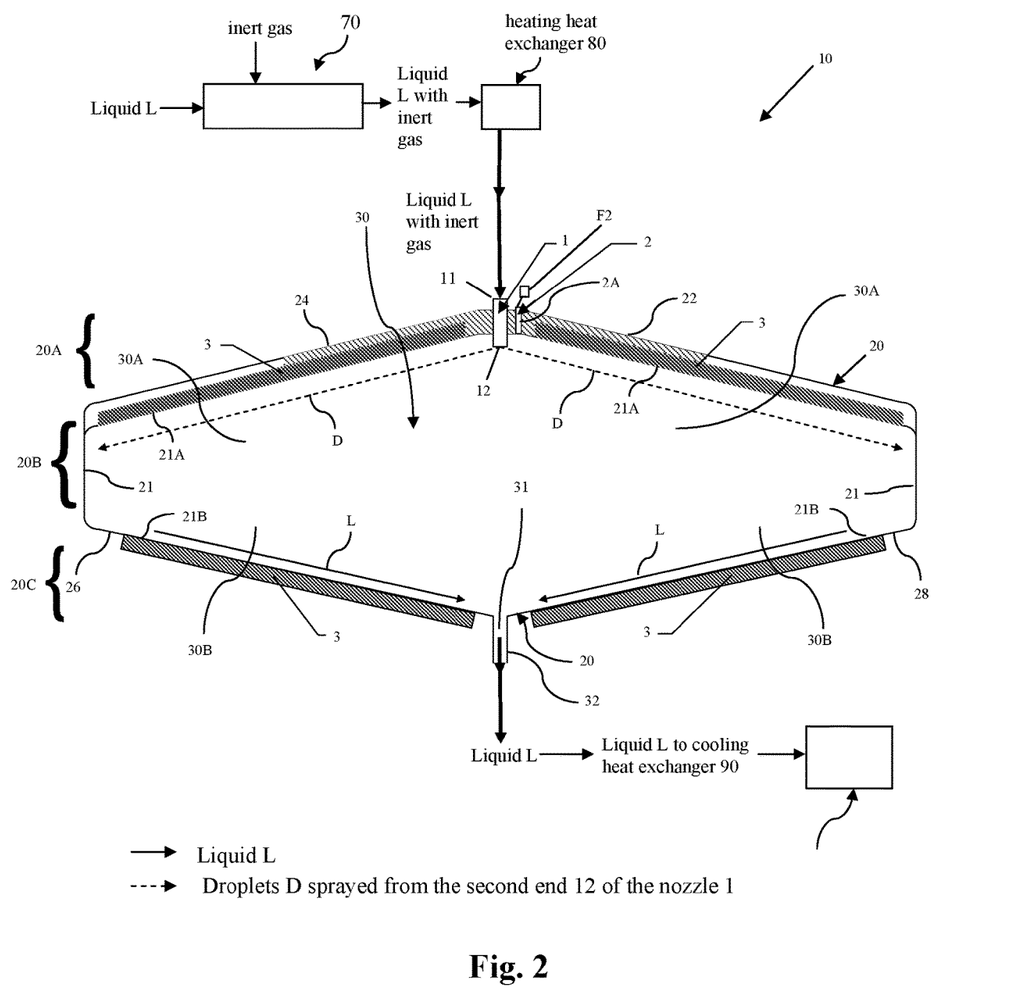
FIG. 2 illustrates a device for treating a liquid in accordance with an exemplary embodiment of the disclosure.

FIG. 1 illustrates general process steps for an exemplary method 100, and FIG. 2 illustrates an exemplary device 10 that can be used to implement the method.

Turning now to FIG. 2, a basic illustration of an exemplary device 10 to perform a method disclosed herein is shown. Device 10 includes first vessel 70, heating heat exchanger 80, second vessel 20, and cooling heat exchanger 90. Liquid L flows or is pumped into first vessel 70, and inert gas is dissolved into the liquid L. The liquid L entering first vessel 70 can have a temperature that preferably is about 4° C.-25° C.

First vessel 70 can be of any suitable material, shape, size, or construction for inert gas to be dissolved into a liquid. First vessel 70 preferably is in fluid communication, such as by one or more pipes, with heating heat exchanger 80. Heating heat exchanger is preferably in fluid communication, such as by one or more pipes, with second vessel 20. Second vessel 20 has an exit 31 leading to an exit pipe 32 that leads outside of vessel 20. In this embodiment, the liquid exiting vessel 20 may be cooled in cooling heat exchanger 90.

Second vessel 20 can be of any suitable shape and size. In the embodiment shown, vessel 20 has an upper frustoconical portion 20A, a generally cylindrical center portion 20B, and a lower frustoconical portion 20C. Second vessel 20 also has a first upper, angled top surface 22, a second angled top surface 24, a first angled bottom surface 26, and a second angled bottom surface 28. Cavity 30 has an upper portion 30A and a lower portion 30B.

In step 101, the liquid L in first vessel 70 has an inert gas (such as nitrogen) dissolved into it. Liquid L is first introduced into the first vessel 70, preferably by being pumped into vessel 70. Prior to being introduced to first vessel 70, the pressure of the liquid may be lowered, such as to one bar. The liquid L may also be cooled or heated before being introduced into first vessel 70. For example, the liquid L may be cooled or heated to the temperature of the room in which first vessel 70 is located.

Inert gas is added to the first vessel 70, preferably after the liquid L is in first vessel 70, at a pressure greater than ambient pressure, such as a pressure greater than ambient pressure by about 10 bar, or any pressure greater than ambient pressure by: between about 10-15 bar, about 13.5 bar, about 12.5 bar or more, about 2 bar or more, about 3 bar or more, about 4 bar or more, about 5 bar or more, about 6 bar or more, about 7 bar or more, about 8 bar or more, about 9 bar or more, about 10 bar or more, about 11 bar or more, about 12 bar or more, about 15 bar or more, or about 5 bar to about 10 bar, about 9 bar to about 12 bar, about 9 bar to about 10.5 bar, or about 9.5 bar to about 13.5 bar. Inert gas is preferably introduced into the first vessel 70 at a higher pressure than the liquid L is inside of first vessel 70 before the inert gas is added. For example, the liquid L may be at about 1 bar inside of vessel 70 and the inert gas may be introduced at a higher pressure in order to raise the overall pressure inside of first vessel 70.

The first pressure is selected based on the type of liquid and the pathogens present in the liquid. In one example, the liquid is bovine colostrum and the first pressure is about 9) bar or more. In another example, the liquid is human blood plasma and the first pressure is about 13.5 bar or more.

The inert gas can be supplied from any suitable source, such as from an outside source (e.g., a cylinder of compressed nitrogen). When introduced into the first vessel 70, at least some of the introduced inert gas is dissolved in the liquid L. This increases the concentration of inert gas in the liquid L to an amount that is greater than the amount of inert gas that would be in the liquid L in first vessel 70 at ambient pressure after the inert gas is introduced. For example, the amount of inert gas in the liquid L may be any amount from about 5% and about 1,000% greater than the amount of inert gas that would be in the liquid in first vessel 70 at ambient pressure. The amount of inert gas could be about 10% or greater, about 20% or greater, about 30% or greater, about 40% or greater, about 50% or greater, about 75% or greater, about 100% or greater, about 200% or greater, about 300% or greater, about 400% or greater, about 500% or greater, about 600% or greater, about 700% or greater, about 800% or greater, about 900% or greater, or about 1,000% or greater, or about 2,000% of greater, than the amount of inert gas that would be in the liquid L at ambient pressure in first vessel 70 when inset has been introduced.

The liquid with inert gas dissolved into it at a pressure greater than ambient pressure, may be referred to herein as a "mixture," or as a "liquid/gas mixture," but is usually referred to as "liquid" or "liquid L." For the purpose of this disclosure, the word "liquid" means liquid with inert gas dissolved into the liquid: when insert gas is dissolved into the liquid at a pressure greater than ambient pressure inside of first vessel 70, and from vessel 70 until after being subjected to the pressure drop in vessel 20. Prior to having the inert gas dissolved into it at a pressure greater than ambient pressure, and after the pressure drop, "liquid" means the liquid L, which may or may not include some inert gas.

Referring to FIG. 1 and FIG. 2, in step 111 the liquid L with inert gas (and still under pressure) is preferably moved under pressure from first vessel 70 (which may be done using a pump) to a heat exchanger 80 and preferably heated. Alternatively, the liquid may be heated in vessel 70, and/or heated at any point between vessel 70 and nozzle 1, or not heated until it enters cavity 30 in vessel 20.

In step 111, the liquid with inert gas is preferably heated to any suitable temperature of about 40° C. to about 60° C., or about 40° C. to about 58° C., or about 35° C. to about 48° C. The temperature of the liquid L after being heated in this step is preferably lower by about 40° or less, or 50° C. or less, or any temperature from about 10° C.-50° C. or less, than the temperature of the liquid L that exits (through exit 31) vessel 20. The temperature of the liquid L exiting exit 31 depends upon the type of the liquid, and the temperature is preferably less than the pasteurization temperature of the liquid, and may be about 45° C.-80° C. when it exits the second vessel 20. In one example the liquid is bovine colostrum that is heated to a temperature of about 40° C. to about 60° C. In another example, the liquid is human blood plasma that is heated to a temperature of about 37° C. to about 48° C.

In step 112, atomization of the liquid L, for example, into droplets of 30-300 μm diameter, with a pressure drop in the cavity 30 of second vessel 20 occurs. At this step the pressure drop occurs and inert gas is rapidly released from liquid L. Alternatively, the pressure drop could be accomplished in any other suitable manner.

As shown in FIG. 2, the pressure drop is accomplished in this embodiment by passing the mixture into first end 11, and through nozzle 1, wherein the liquid is converted into a spray of droplets and inert gas is rapidly released from the liquid as it exits second end 12. The speed of the droplets may be about 40 m/sec, or 40 m/sec or less, or 40 m/sec or more. Or, the speed may be about 100 m/sec or less. The average droplet diameter is any suitable amount, and may be any dimension from about 30 to about 300 micrometers. For bovine colostrum, the average droplet diameter may be about 150 to about 300 micrometers. For human blood plasma, the average droplet diameter may be about 30 to about 150) micrometers.

The reduction in pressure causes inert gas to be rapidly released from the liquid L, which reduces the number of pathogens in liquid L. The reduction in pressure is calculated by subtracting the pressure in cavity 30 from the pressure of the liquid/inert gas mixture entering nozzle 1. For example, the total reduction in pressure may be 12.5 bar (e.g., the pressure of the liquid/inert gas mixture entering first end 11 of nozzle 1 would be 13.5 bar, and the pressure inside of cavity 30 would be 1 bar). Note that the pressure in cavity 30 may be greater than 1 bar, such as any amount up to about 4 bar, or it may be less than 1 bar.

The reduction in pressure may be any amount between about 2-15 bar, or about 2 bar or more, about 3 bar or more, about 4 bar or more, about 5 bar or more, about 6 bar or more, about 7 bar or more, about 8 bar or more, about 9 bar or more, about 10 bar or more, about 11 bar or more, about 12 bar or more, about 12.5 bar or more, about 13 bar or more, about 14 bar or more, about 15 bar or more, any amount between about 12 bar-15 bar, any amount between about 10 bar-15 bar, about 10-12.5 bar.

The rate of reduction in pressure in cavity 30 can be any suitable amount, and may be at any rate between about 1 bar/sec to about 10,000 bar/sec, and preferably not greater than 10,000 bar/sec, although it could be slower or faster, depending upon the type of equipment used, the type of liquid, and the type of pathogens.

In the preferred device shown in FIG. 2, the nozzle 1 converts the liquid L into a spray of droplets falling onto the internal surface 21 of the second vessel 20 into which the liquid L is sprayed. The droplets are preferably heated in cavity 30, such as by an external heating source (shown as heating jackets 3) with circulating hot water, or any other appropriate heating method outside or inside of second vessel 20.

The liquid L is preferably heated from a temperature of about 35° C.-60° C. before it enters cavity 30 to about 45° C.-80° C. inside of cavity 30. In one example, the liquid is bovine colostrum that is heated to about 55° C. to about 80° C. in second vessel 20. In another example, the liquid is human blood plasma that is heated to about 45° C. to about 60° C. in the second vessel. The preferred heating rate is of about 3,000° C./sec-5,000° C./sec, or 4,000° C./sec, but may be any sufficient amount to further decrease the amount of pathogens, such as about 500° C./sec or more, or any rate of about 500° C./sec to about 7,000° C./sec, or about $10^2$ C./sec-$10^3$ C./sec, about $10^3$ C./sec-$10+^\circ$ C./sec, any rate from about 1,000° C./sec-2,000° C./sec, any rate from about 2,000° C./sec-3,000° C./sec, any rate from about 3,000° C./sec-5,000° C./sec, any rate from about 5,000° C./sec-6,000° C./sec, or any suitable rate up to about 5,000° C./sec.

As the liquid is released through second end 12 of nozzle 1 and into cavity 30, the liquid L is preferably converted into a spray of droplets D. In one embodiment, droplets D do not touch the upper, inner wall 21A of top portion 20A. The droplets are projected outward at an angle and preferably first touch either inner wall 21 of portion 20B, or inner wall 21B of lower portion 20C. The droplets D collect and form a flow of liquid L that flows towards exit 31, where the liquid exits vessel 20 through pipe 32.

In step 113, the liquid is collected and preferably cooled to any suitable temperature, such as any temperature from about 8° C.-25° C. after it is collected in the second vessel 20. Such cooling, if performed, is preferably done by a cooling heat exchanger 90 that is outside of vessel 20, at a preferred rate of about 1° C.-5° C./sec. Any suitable cooling method and rate, however, may be used. For example, the cooling rate may be about 2° C./sec, about 3° C./sec, about 4° C./sec, about 5° C./sec, about 6° C./sec, any rate between 5° C./sec and 10° C./sec, or any rate between 0.25° C./sec and 1° C./sec. In one example, the liquid is human blood plasma that is cooled to about 8° C. or lower. In another example, the liquid is orange juice and the temperature is lowered to about 25° C., or to about 25° C. or lower. Then, the cooled liquid is collected in a finishing container, from which it can be sterilely removed.

The temperature to which a liquid is heated depends on the type of liquid and pathogens. When the liquid and/or liquid/gas mixture is heated, the temperature to which it is heated should not be high enough to significantly diminish the desirable qualities of the liquid. Some liquids should not be heated to, or heated above, their pasteurization temperatures.

Second vessel 20 may be fitted with a valve 2 to equalize pressure (preferably automatically) with the ambient, external pressure, which is preferably about 1 bar. There is preferably a pipe 2A from the valve 2, wherein the pipe 2A runs to a filter F2 for purification of the air-gas mix that enters cavity 30 through valve 2. The filter reduces or eliminates pathogens from outside the second vessel 20 that might otherwise enter cavity 30.

While the inventions herein are not limited to any particular theory of operation, the gas pressurized into the liquid L is forced out of the liquid droplets D because of the reduction in pressure in cavity 30. This is believed to help to kill pathogens, which (based on experimentation) converge on the external surface of the liquid droplets. The inert gas molecules that exit the liquid are believed begin to combine in clusters forming numerous, larger bubbles. In some examples, these expand to hundreds of times the size in a fraction of a second. In localized areas of the droplets, the gas molecule clusters have been observed to cause micro-explosions and bursting of bubbles. Numerous localized changes in pressure result in the mechanical destruction of bacteria cell membranes, viral envelopes, and interfere with their receptor functions. The process is rapid, and the pathogens are not able to adapt to the rapid changes in environment. The simultaneous heating of the liquid along with the pressure drop intensifies the described process.

Despite being subject to a method according to this disclosure, proteins, which are smaller than pathogens (e.g., microorganisms and viruses), are reduced to a lesser degree than are the pathogens, which is important for preserving the initial beneficial properties and qualities of the liquid.

Methods and devices according to this disclosure have exhibited the full or partial reduction of pathogens in a liquid, including certain types of virus (HIV, HCV, HSV and others). Following is an example of use of aspects of the invention on human blood plasma.

Example 1

| | Temperature in ° C. of the blood plasma exiting second vessel 20 | Reduction factor (RF), $\log_{10}$ TCID$_{50}$ | | | | |
|---|---|---|---|---|---|---|
| | | Herpes Simplex virus | Poliovirus | Adenovirus | Human Hepatitis C virus | Human Immuno-deficiency virus |
| Test A | 60 | >4.7 | >6.4 | >4.18 | >4.3 | 3.7 |
| Test B | 58 | >4.7 | >6.4 | >4.18 | >4.3 | 2.66 |
| Test C | 56 | 3.2 | 5.0 | >4.18 | 2.56 | 2.58 |
| Test D | 54 | — | 3.0 | — | — | — |
| Test E | 52 | 1.8 | 1.5 | 1.98 | 1.3 | 1.58 |

In this example, human blood plasma was introduced in first vessel 70 (FIG. 2) and then subjected to a pressure of about 13.5 bar, which is about 12.5 bar above ambient pressure (which was about 1 bar). Compressed nitrogen from an outside source (a cylinder of compressed nitrogen) was used to add 0.00004-0.00006 pounds of nitrogen to about 0.13 liters of human blood plasma inside of first vessel 70. Then the blood plasma with inert gas was pumped to heat exchanger 80, where it was heated to 40° C.-48° C., depending upon the temperature of the blood plasma as it exited second vessel 20, as indicated above in Test A-Test E.

Afterwards, the heated blood plasma was introduced to the first end 11 of the nozzle 1 and subjected to a rapid reduction in pressure as it went from about 12.5 bar at the first end 11 of nozzle 1 to about 1 bar as it exited second end 12 and was atomized into cavity 30. As the liquid droplets of blood plasma entered cavity 30 of second vessel 20 they were heated a total amount of about 10° C.-12° C., at a rate of about 4,000° C./sec, to a temperature of about 52° C.-60° C., as indicated above for Test A-Test E.

The treated blood plasma eventually exited cavity 30 through exit 31. Then the collected blood plasma was cooled at about 2° C./sec until the temperature of the blood plasma was about 8° C.

Despite being subject to the method, proteins, which are smaller than pathogens, were practically not destroyed, which is important for preserving the initial desirable properties and qualities of blood plasma. Referring to Example 1, after treatment of the blood plasma the total protein concentration was reduced by from about 4.5% (i.e., 95.5% of the protein remained) at a temperature of about 54° C. of the blood plasma exiting the second vessel, to about 11.9% (i.e., 88.1% of the protein remained) at a temperature of about 60° C. of the blood plasma exiting the second vessel 20.

More Alternate Embodiments

This disclosure also includes embodiments that do not use inert gas, but only heat, rate of heating, pressure, and the rate of pressure drop, to reduce pathogens in a liquid. These embodiments may utilize any of the temperatures, rate of temperature increase, pressure, or rate of pressure drop, discussed previously in this specification. Any of the previously described equipment or method parameters may be utilized. Further, any suitable method steps or parameters that follow could be utilized with any of the above disclosed methods that utilize inert gas.

A method not utilizing inert gas would not require first vessel 70 because inert gas is not dissolved in the liquid under pressure. The liquid L could or could not be heated by heating heat exchanger 80 prior to being released into cavity 30 of vessel 20 and being subject to the pressure drop. Further, any suitable vessel other than vessel 20 could be utilized to perform a method according to these embodiments.

In one embodiment, the process preferably includes diffusing the liquid into droplets (the droplets may have an average diameter of about 100-200 μm, or about 100-400 μm in diameter) utilizing nozzle 1. There would be a pressure drop from first end 11 of nozzle 1 to when the liquid exits second end 12 into cavity 30. Any suitable size or shape of droplets is sufficient, and the droplets may not be of the same size or shape. The speed of the droplets exiting second end 12 of nozzle 1 may be any suitable speed, including the speeds set forth previously.

The liquid may be heated prior to entering the nozzle 1, such as by using heating heat exchanger 80. The liquid may enter the first end of nozzle 1 at about 40° C. to about 80° C., or about 50° C. to about 70° C., or about 52° C. to 56° C., or up to about 75° C., or up to about 60° C., or up to about 65° C., or up to about 70° C., although prior to entering the inlet the liquid may be heated to any suitable temperature depending upon the liquid.

The liquid is also preferably heated after, or while, being subjected to the pressure drop in cavity 30, so that the temperature of the liquid is increased by any suitable amount, such as about 5° C. or more, about 10° C. or more, any temperature of about 5° C. to about 10° C., any temperature of about 10° C. to about 20° C., any temperature of about 20° C. to about 30° C., any temperature of about 20° C. to about 40° C., about 15° C. or more, about 20° C. or more, about 30° C. or more, or about 40° C. or more, or about 50° or more, or any suitable temperature increase, including those previously disclosed for the liquid L in cavity 30. The temperature to which the liquid is heated, before and/or after entering the second vessel 20, is selected based upon the type of liquid and pathogens. The liquid is preferably not heated to a temperature at which the desirable qualities of the liquid are greatly diminished.

When the liquid temperature is increased in vessel 20, it is preferably increased to any suitable temperature, such as any temperature of about 48° C. to about 82° C., or any temperature of about 50° C. to about 75° C., or any temperature of about 62° C. to about 65° C., or about 70° C. or more, or about 75° C. or more, or any suitable temperature, including the temperatures previously disclosed in this description.

Further, the rate of heating the liquid may be about 1° C.-5° C., about one second to sixty seconds per 1° C., about 0.5° C. per second or less, about 1° C. per second, about 1° C. per ten seconds or more, or about 1° C. per second to about 10° C. per sixty seconds, or any suitable rate of heating, including the rates disclosed previously in this description. The liquid may be heated using any known device or method.

All or some of the heating may also be performed in whole or in part after the droplets have been collected in inner cavity 30, or is otherwise collected. Heating collected liquid, if done, can occur inside and/or outside of inner cavity 30, using any suitable device such as a heat exchanger. In one embodiment, the liquid L is partially heated in any desired manner while in droplet form and further heated in any desired manner after being collected. For example, the liquid may be heated by about 5° C. while in droplet form and by about another 5° C. or more after it has been collected, or heated by about 10° C. in droplet form and about another 10° C. after being collected, or heated about 10° C. in droplet form and about another 5° C. after being collected. Alternatively, the liquid may be completely heated in any suitable manner to the desired temperature while in droplet form, or entirely after it has been collected.

The liquid may be heated in the inner cavity 30 due to the temperature maintained in the inner cavity 30, or by introducing stream, hot air, or another substance to heat the droplets. Or, the heating occurs without introducing steam, hot air, or any other substance into inner cavity 30.

Regardless of how the temperature of the liquid L is raised, the liquid can be maintained at that temperature for any desired time, and by any suitable method, after the liquid has been collected. The liquid may be maintained at the higher temperature to which it is raised for any suitable period, such as about 0.5 seconds or more, about one second or more, about two seconds or more, about five seconds or more, about ten seconds or more, about twenty seconds or more, about thirty seconds or more or more, about one minute or more, about two minutes or more, about five minutes or more, about ten minutes or more, about twenty minutes or more, about thirty minutes or more, or any timeframe of about 0.5 sec to about 30 minutes.

A pump may be used for increasing the pressure at the nozzle inlet 11, and a separate pump for regulating the pressure in the inner cavity 30. A second heat exchanger (not shown), may be positioned inside and/or outside of the inner cavity 30, to heat the liquid collected, and a pump (not shown) may be used to pump the collected liquid L out of second vessel 20. Further, inner cavity 30 may be heated as explained herein, by a heating jacket 3 on the outside of vessel 20, or other structures may be used to introduce one or more substances, such as steam or hot air, to heat the droplets exiting nozzle 1.

A suitable pressure drop is utilized to reduce pathogens in the liquid L. The pressure drop could be of any suitable amount, including any of the magnitude disclosed previously in this description. Or, the rate of pressure drop may be about 102 Pa/sec or more, about 103 Pa/sec or more, about 10+Pa/sec or more, about 105 Pa/sec or more, about 109 Pa/sec or more, any rate from about 105 Pa/sec to about 1010 Pa/sec, about eight bar per 1/10,000 second or more, about eight bar per millisecond or more, about eight bar per 1/100 second or more, eight bar per 1/10 second or more, about eight bar per second or more, about eight bar per two seconds or more, about eight bar per five seconds or more, or about eight bar per ten seconds or more.

After being subjected to the pressure drop, and optionally heated, the liquid L is preferably collected in one or more reservoirs in the inner cavity 30. There is preferably one reservoir at the bottom of second vessel 20, but there could be more than one reservoir at more than one location in second vessel 20. The collected liquid L may then be increased in temperature, or maintained at the same temperature, or cooled. The collected liquid, if heated, can be heated either in the inner cavity 3 and/or outside second vessel 20. The liquid L is preferably cooled, such as to a temperature, at a cooling rate, and in the same manner as previously disclosed.

Some non-limiting examples of the disclosure follow:

Example 1: A method of reducing the number of pathogens in a liquid, the method comprising the steps of:

(a) introducing the liquid into a first vessel:
(b) introducing inert gas into the first vessel:
(c) raising the pressure in the first vessel to a first pressure that is greater than 1 bar, and at which at least some of the introduced inert gas dissolves into the liquid; and
(d) introducing the liquid into a second vessel at a second pressure, wherein the second pressure is less than the first pressure, and at least some of the inert gas is released from the liquid at the second pressure.

Example 2: The method of any of example 1, wherein there is a nozzle with a first end and a second end, and that further includes the step of the liquid entering the first end of the nozzle after it leaves the first vessel, and exiting the second end of the nozzle and being introduced into the second vessel.

Example 3: The method of example 1 or 2, wherein the step of raising the pressure to the first pressure occurs as the inert gas enters the first vessel.

Example 4: The method of any of examples 1-3, wherein the first pressure is two times or more greater than the second pressure.

Example 5: The method of any of examples 1-3, wherein the first pressure is three times or more greater than the second pressure.

Example 6: The method of any of examples 1-3, wherein the first pressure is four times or more greater than the second pressure.

Example 7: The method of any of examples 1-3, wherein the first pressure is five times or more greater than the second pressure.

Example 8: The method of any of examples 1-3, wherein the first pressure is six times or more greater than the second pressure.

Example 9: The method of any of examples 1-3, wherein the first pressure is seven times or more greater than the second pressure.

Example 10: The method of any of examples 1-3, wherein the first pressure is eight times or more greater than the second pressure.

Example 11: The method of any of examples 1-3, wherein the first pressure is nine times or more greater than the second pressure.

Example 12: The method of any of examples 1-3, wherein the first pressure is ten times or more greater than the second pressure.

Example 13: The method of any of examples 1-3, wherein the first pressure is about 10 bar and the second pressure is about 1 bar.

Example 14: The method of any of examples 1-3 that further includes the step of heating the liquid, while it is in the first vessel.

Example 15: The method of any of examples 1-14 that further includes the step of heating the liquid when it is in the second vessel.

Example 16: The method of any of examples 1-14 that further includes the step of heating the liquid to about 40° C.-58° C. before it enters the second vessel.

Example 17: The method of example 16 that further includes the step of heating the liquid when it is in the second vessel.

Example 18: The method of any of examples 1-3 or 14-17, in which the first pressure is sufficient to increase the amount of inert gas dissolved in the liquid in the first vessel by a factor of about two or more as compared to the amount of inert gas dissolved in the liquid in the first vessel at 1 bar.

Example 19: The method of any of examples 1-18 that further includes the step of collecting the liquid inside of the second vessel.

Example 20: The method of example 19 that further includes the step of cooling the liquid after it has been collected.

Example 21: The method of example 20, wherein the liquid is cooled at a rate of about 1° C.-5° C. per second, or about 2° C. per second.

Example 22: The method of example 20 or example 21, wherein the liquid is cooled outside of the second vessel.

Example 23: The method of any of examples 1-22, wherein the inert gas is nitrogen.

Example 24: The method of any of examples 1-23, wherein the liquid is selected from one of the group consisting of: water, a blood product, blood plasma, a biological product, milk, fruit juice, coconut milk, liquid food, a pharmaceutical, biological products, a precursor of a biological product, albumin, immunoglobulin, bovine colostrum, serum, culture media, vegetable juice, coconut water, brewer's wort, and wine base.

Example 25: The method of any of examples 1-24, wherein a second end of the nozzle is positioned in an inner cavity of the second vessel.

Example 26: The method of any of examples 1-25, wherein the liquid is pressurized at a first end of the nozzle.

Example 27: The method of example 2, wherein the liquid is subject to about a ten bar or greater pressure drop from the first end of the nozzle and the position at which the liquid exits the second end of the nozzle.

Example 28: The method of example 1 or example 2, wherein the liquid is heated while in the first vessel.

Example 29: The method of example 28, wherein the liquid is heated in the first vessel to a temperature of about 50° C. less, or lower, than the temperature to which the liquid is raised while in the second vessel.

Example 30: The method of example 2, wherein the liquid is subject to about a 12.5 bar or greater pressure drop occurs from the first end of the nozzle and the position at which the liquid exits the second end of the nozzle.

Example 31: The method of example 15 or example 17, wherein the liquid is heated at a rate of about 3,000° C./sec to about 5,000° C./sec in the second vessel.

Example 32: The method of any of examples 1-31 that further includes the step of dropping the pressure of the liquid at a rate of between 1 bar/sec to 10,000 bar/sec as the liquid is introduced into the second vessel.

Example 33: The method of any of examples 2-32, wherein if the nozzle is utilized, the speed of the liquid exiting the second end of the nozzle is about 10 m/sec or more.

Example 34: The method of any of examples 2-33, wherein if the nozzle is utilized, the liquid is heated by a total amount of 5° C. or more inside the second vessel.

Example 35: The method of any of examples 2-34, wherein the nozzle has an outlet with a diameter of between 0.2 mm and 20 mm.

Example 36: The method of any of examples 1-35, wherein the temperature of the liquid is increased in the second vessel to between about 45° C. and about 80° C.

Example 37: The method of any of examples 1-36 that further includes the step of heating the liquid after it exits the first vessel and before it enters the second vessel.

Example 38: The method of any of examples 1-37 that further includes the step of cooling the liquid after it has left the second vessel.

Example 39: The method of any of examples 1-38 that further includes the step of equalizing the pressure between the outside and inside of the second vessel.

Example 40: The method of any of examples 1-39, wherein the step of raising the pressure to the first level occurs before the inert gas enters the first vessel.

Example 41: The method of any of examples 2-40, wherein a first end of the nozzle is positioned outside of an inner cavity of the second vessel.

Example 42: The method of any of examples 2-41, wherein the liquid enters a first end of the nozzle and is atomized into droplets as it exits a second end of the nozzle and enters an inner cavity of the second vessel.

Example 43: The method of any of examples 1-42, wherein the pressure inside of the second vessel is about 1 bar.

Example 44: The method of any of examples 2-43, wherein the liquid exits the nozzle as droplets.

Example 45: The method of any of examples 1-44, wherein the first pressure is about 12.5 bars or greater than the second pressure.

Example 46: The method of example 47, wherein the liquid is heated to a temperature of about 50° C. less, or lower, to the temperature to which the liquid is raised in the second vessel.

Example 47: The method of any of examples 1-46, wherein the liquid is heated by a total amount of 10° C. or more inside the second vessel.

Example 48: The method of example 26, wherein the liquid is at the first pressure when it is at the first end of the nozzle.

Example 49: The method of any of examples 1-2 or 4-48 that includes the step of raising the pressure to the first pressure before the inert gas enters the first vessel.

Example 50: The method of any of examples 1-2 or 4-48 that includes the step of raising the pressure to the first pressure after the inert gas enters the first vessel.

Example 51: The method of any of examples 1-50 that further includes the step of equalizing the pressure between the inside and outside of the second vessel.

Example 52: The method of any of examples 1-51 that further includes the step of creating a lower pressure in the liquid prior to introducing it into the first vessel.

Example 53: The method of any of examples 1-52, wherein the liquid is introduced into the first vessel by pumping it into the first vessel implemented with a pump.

Example 54: The method of any of examples 1-53, wherein the liquid is moved out of the first vessel before being introduced into the second vessel.

Example 55: The method of example 54, wherein the liquid is moved out of the first vessel by a pump.

Example 56: The method of any of examples 1-55, wherein the temperature of the liquid in the first vessel is about equal to the temperature of a room in which the first vessel is located.

Example 57: The method of any of examples 1-56 that further comprises the step of cooling the liquid prior to introducing it into the first vessel.

Example 58: The method of any of examples 1-56 that further includes the step of heating the liquid prior to introducing it into the first vessel.

Example 59: The method of any of examples 56-58, wherein the room temperature is about 17° C. to about 26° C.

Example 60: The method of any of examples 1-59, wherein the inert gas is introduced into the first vessel at a greater pressure than the first vessel.

Example 61: The method of any of examples 1-60, wherein the first pressure is selected based upon the type of liquid and type(s) of pathogen(s).

Example 62: The method of any of examples 1-61, wherein the liquid is bovine colostrum and the first pressure is about 9 bar or greater.

Example 63: The method of any of examples 1-62, wherein the liquid is not heated to a temperature that negatively affects the quality of the liquid.

Example 64: The method of any of examples 1-61 or 63, wherein the liquid is human blood plasma that is heated to about 37° C. to about 48° C. before being introduced into the second vessel.

Example 65: The method of any of examples 1-63, wherein the liquid is bovine colostrum that is heated to about 40° C. to about 60° C. before being introduced into the second vessel.

Example 66: The method of any of examples 1-65, wherein the second pressure is atmospheric pressure or lower.

Example 67: The method of any of examples 1-66, wherein the second vessel has a frustoconical top part having an inner wall, and a cylindrical center part.

Example 68: The method of example 67, wherein the second vessel has a frustoconical lower part.

Example 69: The method of any of examples 67-68 that includes the step of spraying the liquid with dissolved gas into the second vessel so that the sprayed liquid does not contact the inner wall of the frustoconical top part of the second vessel.

Example 70: The method of example 64 in which the human blood plasma with dissolved inert gas is sprayed as droplets into the second vessel and an average droplet diameter is about 30-150 micrometers.

Example 71: The method of example 62 or example 65, in which the bovine colostrum is sprayed as droplets into the second vessel and an average droplet diameter is about 150-300 micrometers.

Example 72: The method of any of examples 2-71, wherein a velocity of droplets exiting the nozzle may be about 40 meters per second or less, or about 40 meters per second or more.

Example 73: The method of any of examples 1-61, 63-64, 67-70, or 72, wherein the liquid is human blood plasma that is heated to about 45° C. to 60° C. in the second vessel.

Example 74: The method of example 1-63, 65-69, or 71, wherein the liquid is bovine colostrum that is heated to about 55° C. to 80° C. in the second vessel.

Example 75: The method of any of examples 1-74, in which the rate of heating the liquid in the second vessel is any suitable rate of 500° C./sec to 7000° C./sec.

Example 76: The method of any of examples 19-61, 63-64, 67-70, 72-73, or 75, wherein the liquid is human blood plasma that is cooled to 8° C. or lower after it is collected.

Example 77: The method of any of examples 18-61, 63, 66-69, 72, or 75, wherein the liquid is orange juice that is cooled to 25° C. or lower after it is collected.

Example 78: The method of any of examples 52-77 that includes the step of lowering the pressure of the liquid to 1 bar or lower before it enters the first vessel.

Example 79: The method of example 57, wherein the liquid is cooled to about the temperature of the room in which the first vessel is located.

Example 80: The method of example 58, wherein the liquid is heated to about the temperature of the room in which the first vessel is located.

Example 81: The method of any of examples 1-17 or 19-80, in which the first pressure is sufficient to increase the amount of inert gas dissolved in the liquid in the first vessel by a factor of three or more as compared to the amount of inert gas dissolved in the liquid in the first vessel at atmospheric pressure.

Example 82: The method of any of examples 1-17 or 19-80, in which the first pressure is sufficient to increase the amount of inert gas dissolved in the liquid in the first vessel by a factor of five or more as compared to the amount of inert gas dissolved in the liquid in the first vessel at atmospheric pressure.

Example 83: The method of any of examples 1-17 or 19-80, in which the first pressure is sufficient to increase the amount of inert gas dissolved in the liquid in the first vessel by a factor of seven or more as compared to the amount of inert gas dissolved in the liquid in the first vessel at atmospheric pressure.

Example 84: The method of any of examples 1-59 or 61-83, wherein the inert gas is introduced into the first vessel at a greater pressure than the first pressure.

Example 85: The method of any of examples 1-84, wherein the first vessel and second vessel are not connected.

Example 86: The method of any of examples 1-85, wherein the liquid is heated in a heating exchanger after it leaves the first vessel and before it enters the second vessel.

Example 87: The method of any of examples 19-86 that further includes the step of removing the collected liquid from the second vessel.

Example 88: The method of any of examples 19-87, wherein the collected liquid is cooled outside of the second vessel.

Example 89: The method of example 88, wherein the collected liquid is cooled by a cooling heat exchanger.

Example 90: The method of any of examples 1-89, wherein the liquid is subject to a pressure drop as it enters the second vessel and the pressure drop is either (a) about two or more bar, (b) about three or more bar, (c) about four or more bar, (d) about five or more bar, (e) about six or more bar, (f) about seven or more bar, (g) about eight or more bar, (h) about nine or more bar, (i) about ten bar or more, (j) about eleven bar or more, (k) about twelve bar or more, (l) about thirteen bar or more, (m) about 13.5 bar or more, or (n) about 15 bar or more.

Example 91: A method for reducing the pathogens in a liquid, the method comprising the steps of:
(a) dissolving an inert gas into the liquid at a first pressure that is greater than 1 bar; and
(b) introducing the liquid into a second vessel at a second pressure, wherein the second pressure is less than the first pressure, and inert gas is released from the liquid at the second pressure.

Example 92: The method of example 91 that further includes one or more of the parameters, steps, or devices of any one or more of examples 1-90.

Example 93: A method for reducing the pathogens in a liquid, the method comprising the steps of:
(a) heating the liquid to a temperate of 50° C. or less than a temperature of the liquid and when it exits a second vessel:
(b) introducing the liquid into a second vessel and heating it by 5° C. or more.

Example 94: The method of example 93, wherein the liquid is heated by 10° C. or more in the second vessel.

Example 95: The method of example 93 or 94 that further includes one or more of the parameters, steps, or structures of any one or more of examples 1-90.

Example 96: A method of reducing the pathogens in a liquid, the method comprising the steps of:
(a) pressurizing the liquid to a first pressure greater than 1 bar; and
(b) introducing the liquid into a second vessel at a second pressure, wherein the second pressure is less than the first pressure.

Example 97: The method of example 96 that further includes one or more of the parameters, steps, or structures of any one or more of examples 1-90.

Example 98: The method of any of examples 1-92, wherein some inert gas is in the liquid when the liquid is at the second pressure.

Other methods and devices may be utilized that do not include the use of inert gas, first vessel 70, and possibly not heat exchanger 80. At least some types of pathogens can be reduced by using second vessel 20, potentially with one or more of heat exchanger 80 and heat exchanger 90. Some non-limiting examples of such a method follow.

Steps according to the methods herein may be performed in any order suitable to achieve a desired end product. The liquid is heated to appropriate temperatures for each liquid, those temperatures known to those skilled in the art. Additionally, after treatment utilizing a device and method according to the invention, the treated liquid may be treated a second time using any suitable device and method.

The present invention has been described above with reference to a number of exemplary embodiments and examples. The particular embodiments shown and described herein are illustrative of the exemplary embodiments, and are not intended to limit the scope of the invention. Changes and modifications may be made to the embodiments described herein without departing from the scope of the present invention. These and other changes or modifications are intended to be included within the scope of the claimed invention and the legal equivalents thereof.

What is claimed is:

1. A method of reducing the number of pathogens in a liquid, the method comprising the steps of:
   (a) introducing the liquid into a first vessel;
   (b) introducing inert gas into the first vessel;
   (c) raising the pressure in the first vessel to a first pressure at which at least some of the introduced inert gas is dissolved in the liquid;
   (d) passing the liquid through a nozzle having a first end at which the liquid enters at the first pressure, and a second end at which the liquid exits into a second vessel at a second pressure, wherein the second pressure is less than the first pressure, and at least some of the inert gas is released from the liquid at the second pressure, wherein the liquid is converted into a spray of droplets while leaving the second end, wherein the second vessel comprises a frustoconical top part comprising an inner wall, a cylindrical center part, and a frustoconical lower part; and (e) heating the liquid as the spray of droplets in the second vessel at the second pressure to a temperature greater than 50° C., wherein heating the liquid comprises droplets contacting one or more of the cylindrical center part and the frustoconical lower part, wherein the liquid does not contact the inner wall of the frustoconical top part of the second vessel, and wherein the liquid is heated at a rate of about 3,000° C./sec to about 5,000° C./sec.

2. The method of claim 1, wherein the step of raising the pressure to the first pressure occurs when the inert gas enters the first vessel.

3. The method of claim 1, wherein the step of raising the pressure to the first level occurs before the inert gas enters the first vessel.

4. The method of claim 1, wherein the first pressure is between about 2 and 15 bar greater than the second pressure.

5. The method of claim 1, wherein heating the liquid occurs without introducing steam, hot air, or any additional substance into an inner cavity of the second vessel.

6. The method of claim 1, wherein the first pressure is between about 10 and 12.5 bar greater than the second pressure.

7. The method of claim 1, further comprising cooling the liquid after it leaves the second vessel, and wherein the liquid is maintained at the temperature greater than 50° C. between 0.5 seconds and about 30 minutes.

8. The method of claim 1, wherein the temperature is lower than a pasteurization temperature of the liquid, wherein the liquid is maintained at the temperature between 0.5 seconds about 30 minutes.

9. The method of claim 1, wherein heating the liquid occurs without introducing steam, hot air, or any additional substance into an inner cavity of the second vessel, wherein the average droplet diameter is about 30 micrometers to 300 micrometers.

10. The method of claim 1, wherein the first pressure is 13.5 bar or more and the second pressure is 1 bar.

11. The method of claim 1 that further includes the step of heating the liquid before it is in the first vessel to 4° C.-25° C.

12. The method of claim 1 that further includes the step of heating the liquid after it leaves the first vessel and before it enters the nozzle.

13. The method of claim 11, wherein the liquid is heated at the first pressure after it leaves the first vessel before it reaches the nozzle to a temperature between 35° C. and 48° C.

14. The method of claim 13, that further includes the step of heating the liquid to 45° C.-80° C. in the second vessel.

15. The method of claim 1, wherein the cylindrical center part directly connects the frustoconical top part to the frustoconical lower part.

16. The method of claim 1, further comprising the spray of droplets collecting on the frustoconical lower part and forming a volume that flows toward an exit of the second vessel.

17. The method of claim 16 that further includes the step of moving the liquid outside of the second vessel before it is cooled.

18. The method of claim 1, wherein the liquid is selected from one of the group consisting of: water, a blood product, blood plasma, fruit juice, coconut milk, vegetable juice, coconut water, brewer's wort, and wine base.

19. The method of claim 1, wherein the liquid is selected from one of the group consisting of: water, a blood product, blood plasma, fruit juice, coconut milk, a pharmaceutical, a precursor of a biological product, albumin, immunoglobulin, bovine colostrum, serum, culture media, vegetable juice, coconut water, brewer's wort, and wine base.

20. The method of claim 1, further comprising heating the liquid before it enters the nozzle to a temperature of 10° C. less to 50° C. less, than a temperature at which the liquid exits the second vessel.

21. The method of claim 16, wherein the liquid is cooled to a temperature between 8° C. to 25° C.

22. The method of claim 21, wherein the liquid is cooled at a rate of 1° C.-5° C. per second.

23. The method of claim 1, further comprising heating the liquid in the first vessel.

* * * * *